Feb. 21, 1950     E. A. STALKER     2,498,140
BLOWER DRIVE FOR BOUNDARY LAYER
CONTROL SYSTEMS ON AIRCRAFT
Filed Jan. 12, 1946     2 Sheets-Sheet 1
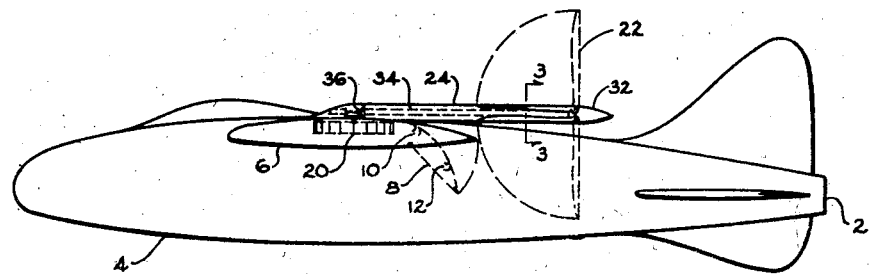
INVENTOR.
Edward A. Stalker
BY Marechal & Biebel
ATTORNEYS Feb. 21, 1950 — E. A. STALKER — 2,498,140
BLOWER DRIVE FOR BOUNDARY LAYER CONTROL SYSTEMS ON AIRCRAFT
Filed Jan. 12, 1946 — 2 Sheets-Sheet 2
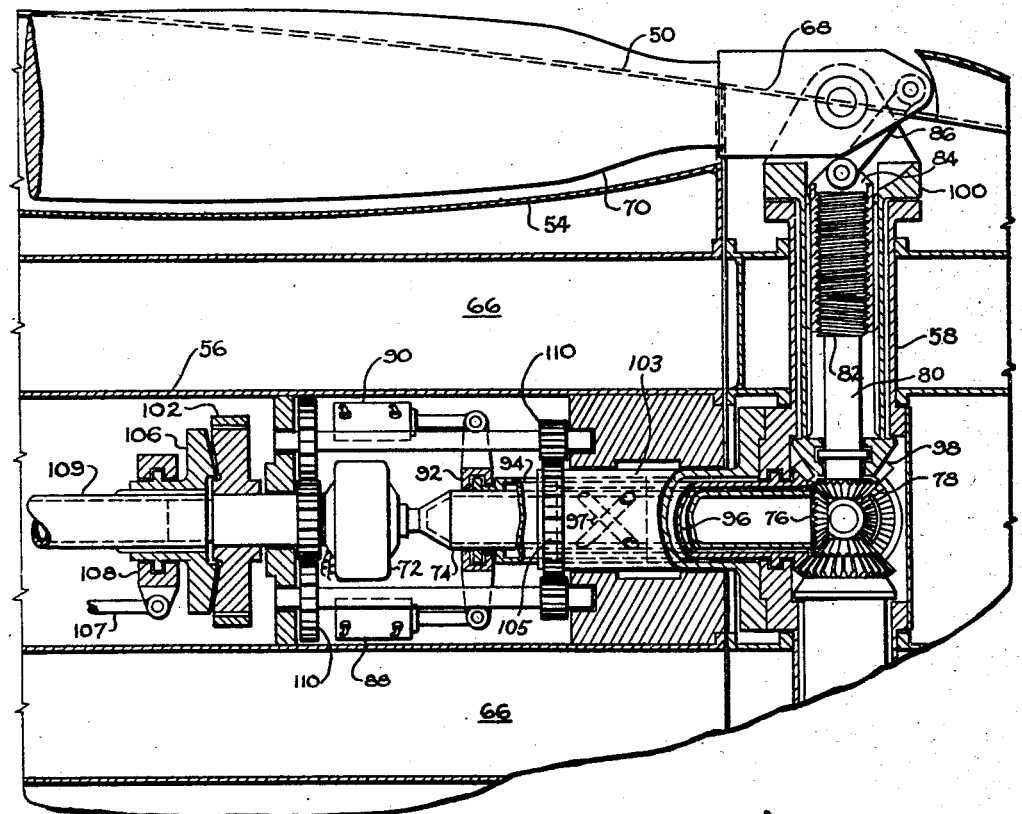
Fig. 7
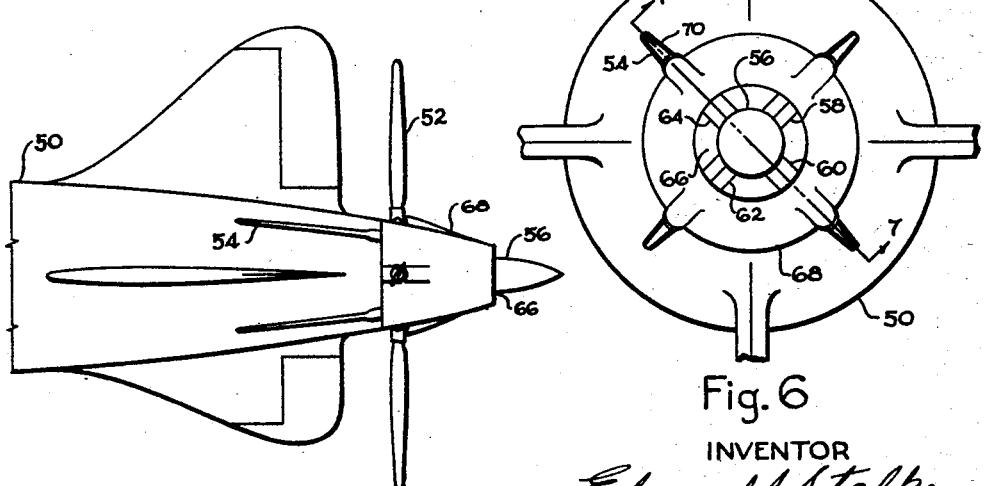
Fig. 5
Fig. 6
INVENTOR
Edward A. Stalker
BY Marshal & Biebel
ATTORNEYS Patented Feb. 21, 1950

2,498,140

UNITED STATES PATENT OFFICE 2,498,140

BLOWER DRIVE FOR BOUNDARY LAYER CONTROL SYSTEMS ON AIRCRAFT

Edward A. Stalker, Bay City, Mich.

Application January 12, 1946, Serial No. 640,866

3 Claims. (Cl. 244—40)

This invention relates to aircraft and particularly to the drive of the blower employed in the boundary layer control system.

The principal object of the invention is to provide a prime mover operated by the relative wind for driving the blower in a boundary layer control system, particularly for generating a large lift coefficient.

Other objects will appear from the description, drawings and claims.

I accomplish the above objects by the means illustrated in the accompanying drawings in which—

Fig. 1 is a side elevation of an aircraft equipped with the power device of the present invention;

Fig. 2 is a fragmentary plan view of the wing showing the device;

Fig. 3 is a section along the line 3—3 in Fig. 1;

Fig. 3a shows an alternate arrangement for three blades instead of two as in Fig. 3;

Fig. 4 is a section along the line 4—4 in Fig. 3;

Fig. 5 is a fragmentary side elevation of an alternate form of the invention;

Fig. 6 is an end view of the form shown in Fig. 5; and

Fig. 7 is a section along the line 7—7 in Fig. 6.

Where airplanes are propelled by other devices than propellers it is difficult to provide a source of auxiliary power which is always certain to be available. This is particularly true of jet-propelled aircraft such as the airplane 1 in Fig. 1. This machine derives its propulsion from the jet emitted from the nozzle 2 in the aft end of the fuselage 4.

The airplane has the wing 6 equipped with the flap 8 having the induction slots 10 and 12 incorporated in its upper surface. The blower 20 has its inlet in communication with these slots through the interior of the wing through which it inducts the boundary layer into the wing which will produce a large lift coefficient especially with the flap 8 lowered to a substantial angle with the main body of the wing.

It is a feature of this invention that blower 20 is driven by a windmill 22 supported by the boom 24 extending rearward from the wing. The windmill has two blades 26 and 27 pivoted on the hub 32. As an alternate a windmill having three blades 28, 29 and 30 is shown in Fig. 3a. These windmills are to be used at the time of landing to drive the blower 20. During high speed flight the blades are retracted into suitable recesses in the boom as illustrated. Fig. 4 shows the mechanism operated by the pilot to control the blades.

To extend or retract the blades (Fig. 4), the pilot operates a hand-pump 36 connected to the hydraulic cylinder 38 by the oil line 40. The piston 42 is connected to the rod 44 by a slip-bearing 46. The rod rotates the hinged blades into their position by means of a double rack 48 and blade pinion segments 50 and 52 located within the hub 32. Only a few of the teeth are shown on the rack and pinion segments but they have sufficient teeth to be always in mesh. The blades of the windmill are pivotally attached as shown at 33 to hollow shaft 34 which drives the blower by means of a gear train 36.

It is to be understood that, although suction slots in the wing have been illustrated, the invention is adaptable to discharge or pressure slots by simply rearranging the blower and slot relationship and forming the slots to discharge along the wing surface toward the trailing edge.

In an alternate form of the invention, the windmill unit is located at the aft end of the fuselage or nacelle from which the jet is expelled, and has hinged blades which fold into recesses in the surface of the fuselage or nacelle. Another feature of this alternate form is that the windmill can be utilized as a propeller for additional thrust at take-off or at any other time when the jet efficiency is low owing to the low velocity of the airplane.

A partial side view of a fuselage 50 incorporating a jet engine and a four-blade windmill-propeller 52 is shown in Fig. 5. The blades of the windmill are shown in the opened position and when folded lie in the recesses 54. An end view of the fuselage is shown in Fig. 6 and shows the blades in the retracted position. The hub 56 has four arms 58, 60, 62 and 64 which extend through the annular jet exit 66 into the cowling 68 and at the end of which the blades are hinged.

The propeller hub mechanism for operating all four blades simultaneously is shown in Fig. 7. It is shown as housed within the central hub cylinder 56 around which is the jet passage 66. To rotate the blade 70 to its open position, the pilot starts the electric motor 72 by suitable switch means located in the cockpit, the armature of the motor being connected directly to a shaft 74 having on its other end a gear 76. This gear by means of mating gear 78 mounted on a shaft 80 within the hub arm 58, rotates the screw 82 which causes the sleeve 84, suitably held against rotation, to move toward the center of the hub and thus by means of the link 86 rotates the blade to its open position.

The blade at this instant is full-feathered. To change the pitch of the blade the pilot through suitable controls causes the hydraulic rams 88 and 90 to be actuated thus shifting the slip-ring 92 which slides the sleeve 94 forward bringing about a rotation of the shaft 96 mounted internally thereof by the cam slots 97. Through the action of the gear train 98, the blade shank 100, to which the blade is hinged and which is seated within the hub arm 58, is rotated until the desired blade pitch setting is obtained.

After the blades have been fully opened the brake 102 is released and the windmill is free to rotate. Such rotation of the windmill is transmitted to arms 58, etc. and through them to outer sleeve 103 on which is mounted drive gear 105. When power is to be applied to or taken from the windmill, the clutch 106 is engaged through the action of the push-rod 107 on the slip-ring 108 thus connecting the windmill to the turbine and compressor unit by means of the shaft 109. The function of the gear train 110 in driving relation with gear 105 is to produce the desired relative shaft speed between the windmill and the turbine-compressor unit to provide for operation of the latter at a substantially increased speed.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination in an aircraft, a wing having a slot in its surface leading into the wing interior, a blower in communication with said interior and with said slot, means to drive said blower including a windmill, a structure extending rearward supporting said windmill aft of said wing for rotation by the relative wind about a substantially horizontal axis, said structure having a recess therein, means to apply the power of said windmill for the operation of said blower, said windmill having adjustable blades, and means to move said blades into said recess of said structure.

2. In combination in an aircraft, a body having a recess, a jet engine in said body emitting a jet rearward to propel the aircraft, a wing having a slot in its surface, a blower in communication with said slot to induce a flow therethrough, a hub having a passage therethrough to encompass said jet, means for driving said blower from said hub, a blade adjustably mounted on said hub and effective with respect to the relative wind, and means to move said blade into said recess of said body to remove said blade from the action of the relative wind.

3. In combination in an aircraft having a recess in the outer surface thereof, a wing having a slot in its surface leading into the wing interior, a blower in communication with the wing interior to induce a flow of air through said slot, a windmill blade, means for mounting said blade for rotation about a substantially horizontal axis to derive power from the relative wind, means to apply said power to effect the operation of said blower, means to position said blade in said recess in its inoperative condition, and means to propel the aircraft forward.

EDWARD A. STALKER.

REFERENCES CITED

The following references are of record in the file of this patent:

UNITED STATES PATENTS

| Number | Name | Date |
|---|---|---|
| 1,419,877 | Martel | June 13, 1922 |
| 1,427,257 | Bowen et al. | Aug. 29, 1922 |
| 1,913,644 | Stalker | June 13, 1933 |
| 2,026,885 | Goddard | Jan. 7, 1936 |
| 2,219,980 | Seversky | Oct. 29, 1940 |
| 2,272,664 | Gropler | Feb. 10, 1942 |
| 2,395,513 | Stalker | Feb. 26, 1946 |